J. BOLKOVAC.
LATHE ATTACHMENT.
APPLICATION FILED FEB. 19, 1916.
1,200,703.
Patented Oct. 10, 1916.
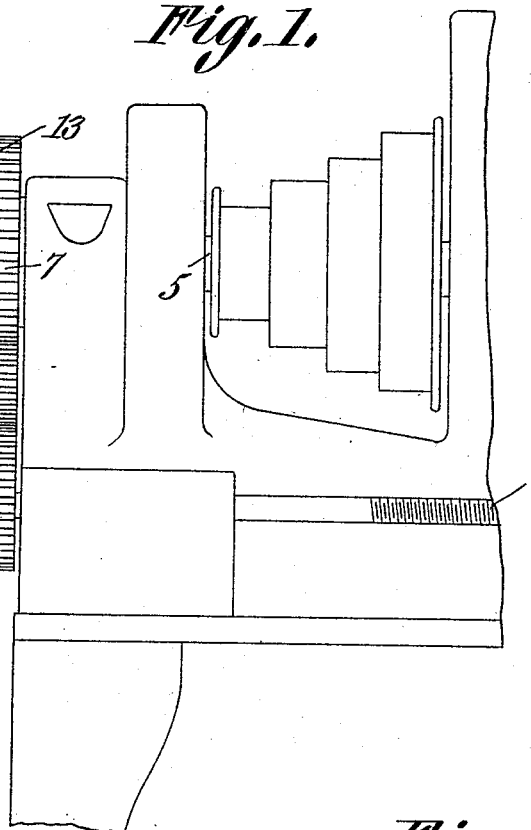
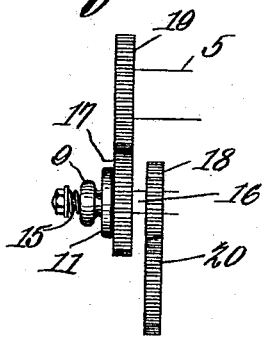
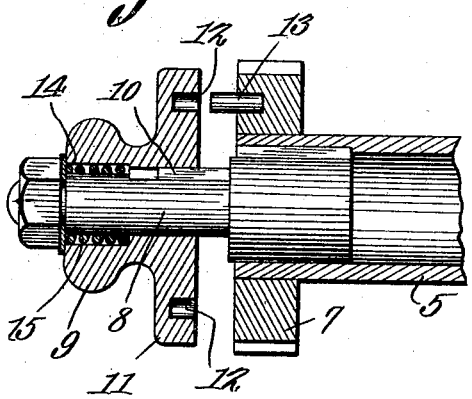
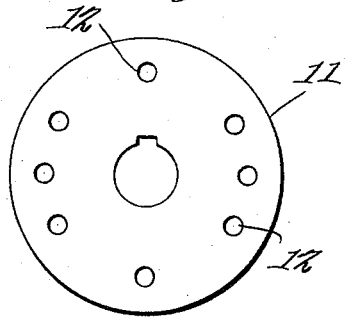
J. Bolkovac, Inventor
By Max A. Schmidt
Attorney

UNITED STATES PATENT OFFICE.

JOSEF BOLKOVAC, OF McKEES ROCKS, PENNSYLVANIA, ASSIGNOR OF ONE-HALF TO AUGUST H. ANGER, OF McKEES ROCKS, PENNSYLVANIA.

LATHE ATTACHMENT.

1,200,703.   Specification of Letters Patent.   Patented Oct. 10, 1916.

Application filed February 19, 1916.  Serial No. 79,357.

*To all whom it may concern:*

Be it known that I, JOSEF BOLKOVAC, a citizen of the United States, residing at McKees Rocks, in the county of Allegheny and State of Pennsylvania, have invented certain new and useful Improvements in Lathe Attachments, of which the following is a specification.

The device which is the subject matter of the present application for patent is an attachment for lathes, the same being designed to facilitate the cutting of multiple-threaded screws.

When cutting multiple-threaded screws on a lathe by the method in general use at the present time, the machinist divides the gear on the end of the lathe spindle into two or more parts, equally spaced, and corresponding in number to the number of threads to be cut. These division marks or points are placed on the circumference of the gear. After finishing the first thread, the machinist disengages the gear from the spindle and turns it one of the divisions in advance of its original position, and after again securing the gear to the spindle, the next thread is started. Thus for a double thread the gear is divided into two equal parts; for a triple thread into three equal parts, and for a quadruple thread into four equal parts, and so on. With this method of cutting multiple threads, the gear on the end of the lathe spindle must have such a number of teeth as would be exactly divisible by two, three and four; otherwise the lathe will not cut double, triple and quadruple threads.

To improve this method of multiple-thread cutting the present attachment has been devised, and in order that the same may be better understood, reference is had to the accompanying drawing, in which—

Figure 1 is an elevation of a fragment of a lathe showing the application of the attachment; Fig. 2 is a central longitudinal section of the attachment in disengaging position; Fig. 3 is a face view of one of the elements of the attachment, and Fig. 4 is an elevation showing a modification.

Referring specifically to the drawing, 5 denotes the live spindle of the lathe, or that spindle which rotates and turns the piece to be operated on. The lead screw is shown at 6, the same being driven from the spindle 5 through the usual train of gears including a gear 7 on said spindle. A stud 8 is keyed or otherwise fixed to the rear end of the spindle 5 in axial alinement therewith. On the projecting end of the stud is slidably mounted a knob or head 9 which also rotates with the stud, it being connected thereto by a feather key 10. This knob faces the gear 7, and its end which is next to the gear has a circular flange 11 provided with a series of holes 12 facing the gear, the latter having fixed to its face a pin 13 adapted to enter any one of the holes and thus couple the knob and the gear together. The knob 9 is counterbored at 14 to receive a coiled spring 15 which tends to advance the knob toward the gear 7 and hold the pin 13 seated in the selected hole 12.

It will be seen from the foregoing that there is provided a driving connection between the knob 9 and the gear 7, and as the knob is fixed to the stud 8 and the latter is fixed to the spindle 5, the driving connection between the gear and the spindle is through the knob and the stud, and upon backing the knob away from the gear to take the pin out of the hole, the driving connection is broken. Originally, the gear is keyed to the spindle, but when the attachment is applied the key is removed, so that the gear may run loose on the spindle.

When the knob 9 is disconnected from the gear 7, the spindle 5 may be turned by means of the knob, the gear now remaining stationary, so that no movement is transmitted to the lead screw 6. The gear turns with the spindle only when the knob is coupled to the gear.

The attachment operates as follows: The machinist, after making one cut for the first thread, uncouples the knob 9 and gear 7, and by means of the former, gives the spindle 5 a quarter, half, third or other turn according to the number of threads to be cut. This operation properly positions the piece for the next thread, and after again coupling the knob and the gear, the cut for the second thread is made, after which the operation is repeated for the third thread, etc. Thus, the machinist with the attachment can take the same cut for each thread and finish all the threads at the same time, which gives a more perfect thread than by finishing each thread separately. The extent to which the spindle may be turned is correctly gaged by the holes 12, and all practical multiple threads can be cut with eight holes arranged as shown in Fig. 3.

The attachment need not necessarily be applied to the spindle 5, but may, with equal facility, be applied to one of the gears of the train which drives the lead screw 6. This arrangement is illustrated in Fig. 4. Here a stud 16 which carries two gears 17 and 18 is employed for the application of the attachment. The gear 17 is in mesh with a gear 19 on the spindle, said gear corresponding to the gear 7 hereinbefore described, it being however left fast on the spindle. The gear 18 is in mesh with one of the intermediate gears 20 of the train. Ordinarily, the gears 17 and 18 turn together, but when the attachment is used, the key of the gear 17 is removed so that it may run loose on the stud 16. The knob 9 is applied to the stud 16, and the pin 13 is applied to the gear 17. It will therefore be seen that when the knob is uncoupled from the gear 17, the latter runs loose on the stud 16, and the driving connection of the train is broken. The spindle may now be turned to give the work the required angular advance, and upon again coupling the knob to the gear 17, the driving connection is restored and the operation may proceed.

I claim:

1. In a lathe, the combination with the live spindle, the lead screw, and the drive gear train therebetween; of a coupling associated with the gear train for establishing and breaking the driving connection between said spindle and lead screw, one member of the coupling having a series of angularly spaced index and coupling apertures, and the other member of the coupling being carried by one of the gears of the train and adapted to enter said apertures, said gear being loose.

2. In a lathe, the combination with the live spindle, the lead screw, and the drive gear train therebetween; of a coupling associated with the gear train for establishing and breaking the driving connection between said spindle and lead screw, one member of the coupling having a series of angularly spaced index and coupling apertures, and the other member of the coupling being carried by one of the gears of the train and adapted to enter said apertures, said gear being loose, and the first-mentioned coupling member being longitudinally slidable to engage and disengage the second-mentioned coupling member.

3. In a lathe, the combination with the live spindle, the lead screw, and the driving connection therebetween; of a coupling for establishing and breaking the driving connection, said driving connection including a loose gear on the spindle, one of the members of the coupling being on said gear, and the other member of the coupling being fast on the spindle, and having a series of angularly spaced index and coupling apertures adapted to be entered by the first-mentioned coupling member.

4. In a lathe, the combination with the live spindle, the lead screw, and the driving connection therebetween; of a coupling for establishing and breaking the driving connection, said driving connection including a gear loose on the spindle, one of the members of the coupling being carried by said gear, and the other member of the coupling being connected to the gear to turn therewith and slide lengthwise, said second mentioned coupling member having a series of angularly spaced index and coupling apertures adapted to be entered by the first-mentioned coupling member.

5. In a lathe, the combination with the live spindle, the lead screw, and the driving connection therebetween; of a coupling for establishing and breaking the driving connection, said driving connection including a gear loose on the spindle, one of the members of the coupling being a pin carried by said gear, and the other member of the coupling being longitudinally slidable and having a series of angularly spaced apertures adapted to be entered by the pin, a stud fixed to the rear end of the spindle in axial alinement therewith, on which stud the second mentioned coupling member is mounted to slide and turn therewith, and a spring engageable with the second mentioned coupling member for forcing the same in a direction to hold the two coupling members engaged.

In testimony whereof I affix my signature.

JOSEF BOLKOVAC.

Copies of this patent may be obtained for five cents each, by addressing the "Commissioner of Patents, Washington, D. C."